(12) United States Patent
Choi

(10) Patent No.: US 8,501,134 B2
(45) Date of Patent: Aug. 6, 2013

(54) PROCESS AND CATALYST FOR DESULFURIZATION OF HYDROCARBONACEOUS OIL STREAM

(75) Inventor: Ki-Hyouk Choi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 13/305,451

(22) Filed: Nov. 28, 2011

(65) Prior Publication Data

US 2012/0067781 A1   Mar. 22, 2012

Related U.S. Application Data

(63) Continuation of application No. 12/276,942, filed on Nov. 24, 2008, now Pat. No. 8,088,711.

(60) Provisional application No. 60/991,475, filed on Nov. 30, 2007.

(51) Int. Cl.
| | |
|---|---|
| *B01D 53/48* | (2006.01) |
| *B01D 53/52* | (2006.01) |
| *B01D 50/00* | (2006.01) |
| *B01D 59/26* | (2006.01) |
| *B01D 53/02* | (2006.01) |
| *B01J 8/00* | (2006.01) |
| *B01J 21/18* | (2006.01) |
| *B01J 23/00* | (2006.01) |
| *C01B 31/08* | (2006.01) |
| *B03C 3/40* | (2006.01) |

(52) U.S. Cl.
USPC ............ 423/242.1; 423/244.09; 423/244.03; 422/169; 422/170; 502/416; 502/180; 502/184; 96/121; 96/134; 96/143

(58) Field of Classification Search
None
See application file for complete search history.

(56) References Cited

U.S. PATENT DOCUMENTS

| 1,819,055 | A | * | 8/1931 | Al et al. .................. 423/244.09 |
| 4,865,826 | A | * | 9/1989 | Carnell et al. ................ 423/230 |
| 7,029,639 | B2 | * | 4/2006 | Yasutake et al. ......... 423/244.09 |
| 8,216,344 | B2 | * | 7/2012 | Degenstein et al. ............ 95/129 |
| 8,282,715 | B1 | * | 10/2012 | Degenstein et al. ............ 96/121 |

* cited by examiner

*Primary Examiner* — Melvin C Mayes
*Assistant Examiner* — Guinever Gregorio
(74) *Attorney, Agent, or Firm* — Contance Rhebergen; Bracewell & Giuliani LLP

(57) ABSTRACT

The invention relates to a process and catalyst for the oxidative desulfurization of hydrocarbonaceous oil. In one aspect, solid carbon materials are provided having stable sulfur trioxide and nitrogen dioxide oxidative species on the surface thereof. Such materials are useful in the production of low sulfur hydrocarbon feedstocks and in the removal of refractory sulfur compounds.

18 Claims, 7 Drawing Sheets

PROCESS AND CATALYST FOR DESULFURIZATION OF HYDROCARBONACEOUS OIL STREAM

RELATED PATENT APPLICATION

This patent application claims priority to U.S. Provisional Patent Application Ser. No. 60/991,475, filed on Nov. 30, 2007. This patent application is a continuation of U.S. patent application Ser. No. 12/276,942, filed on Nov. 24, 2008, now issued as U.S. Pat. No. 8,088,711, each of which are incorporated by reference in their entirety.

BACKGROUND OF THE INVENTION

1. Technical Field of the Invention

This invention relates generally to the field of the removal of sulfur from hydrocarbonaceous products. Specifically, the invention relates to a heterogeneous catalyst and process for the oxidative desulfurization of hydrocarbonaceous oil.

2. Description of the Prior Art

In the petroleum industry, it is common for hydrocarbonaceous oils, particularly middle distillate petroleum fuels, to contain sulfur species. Increasing concerns regarding pollutants present in the atmosphere have led to a desire to decrease the sulfur content of fuels used in engines, as engines and vehicles utilizing fuels which contain sulfur can produce emissions of nitrogen oxide, sulfur oxide and particulate matter. Government regulations have become more stringent in recent years with respect to allowable levels of the potentially harmful emissions.

Traditionally, thiophenic sulfur species contained in hydrocarbonaceous feedstock are removed by catalytic hydrodesulfurization at high temperature and high pressure in the presence of hydrogen. Typical hydrodesulfurization catalysts generally include cobalt-molybdenum sulfide, nickel-molybdenum sulfide or nickel tungsten sulfide, typically supported on alumina based materials. Hydrodesulfurization catalysts are commercially available and are generally known in the art.

There are however deficiencies in the removal of thiophenic species from hydrocarbonaceous sources by catalytic hydrodesulfurization.

Although reliable in the removal of thiophenic sulfur species, and capable of achieving relatively low sulfur content, catalytic hydrodesulfurization requires a low flow rate, high hydrogen pressure, high hydrogen consumption and high reaction temperatures to achieve sulfur contents of less than 10 ppm. Additionally, in certain applications, a sulfur content of near zero, or less than 1 ppm, may be desired. These specifications are difficult to achieve with present methods.

It is known that during desulfurization of a hydrocarbon stream, as the severity of the desulfurization conditions is increased, the level of residual sulfur containing hydrocarbons decreases. This is because certain sulfur compounds are more susceptible to catalytic desulfurization under certain reaction conditions than are others. Not wishing to be bound to any theory, it is believed that the location of the sulfur atom plays an important role in determining if the sulfur atom will more readily react with the catalytic site. If the sulfur atom is sterically hindered, it is believed that more severe reaction conditions must be employed in order to react and remove the sulfur atom from the hydrocarbonaceous compound. Additionally, it is believed that the nitrogen compounds that are present in the hydrocarbonaceous stream are strong inhibitors against hydrodesulfurization of refractory sulfur species.

Sulfur is found in refinery streams in a number of different forms including aliphatic and aromatic sulfur compounds, but tends to be concentrated in the higher boiling fractions. Generally, the sulfur compounds are present in the form of thiophenes and aromatic heterocyclic compounds such as benzothiophenes and dibenzothiophenes. As noted previously, conventional hydrodesulfurization techniques are capable of removing most sulfur compounds, particularly the lower molecular weight species including the aliphatic sulfur materials, thiophenes and dibenzothiophenes. However, certain sulfur compounds, such as sterically hindered compounds, are more difficult to remove than others. For example, substituted dibenzothiophenes are generally less amenable to hydrodesulfurization than dibenzothiophene itself, likely because of the sterically hindered sulfur atom. This effect varies according to the extent and type of substitution in dibenzothiophene.

Conversion of dibenzothiophenes can require high hydrogen partial pressures and recycling rates, low space velocity and high temperatures, implying a significant increase in the capacity of the hydrogen recycling system, an increase in the reactor bed size, an increase in the operating pressure, a decrease in cycle length, or combinations thereof. Conducting the desulfurization at such severe reaction conditions generally results in relatively short catalyst life times.

Therefore, improved methods for the desulfurization of hydrocarbonaceous streams that include refractory sulfur compounds are needed. More specifically, methods for the desulfurization and production of hydrocarbonaceous streams containing less than 10 ppm sulfur, or more preferably, less than 5 ppm sulfur, are needed.

SUMMARY OF THE INVENTION

A heterogeneous oxidative desulfurization catalyst composition, a method for preparing an oxidative desulfurization catalyst and a method of oxidatively removing sulfur compounds, particularly refractory sulfur compounds, from hydrocarbonaceous feedstock are provided.

In a first aspect, a method for removing sulfur from a hydrocarbonaceous feedstock is provided that includes the steps of contacting a hydrocarbonaceous feedstock that includes sulfur with a desulfurization catalyst to selectively oxidize at least a portion of the sulfur present to produce oxidized sulfur compounds and a low sulfur hydrocarbonaceous feedstock. The oxidized sulfur compounds are separated from a low sulfur hydrocarbonaceous feedstock and a low sulfur hydrocarbonaceous feedstock is recovered.

In certain embodiments, the low sulfur hydrocarbonaceous feedstock has a sulfur content of less than about 10 ppm, preferably less than about 5 ppm, and even more preferably less than about 2 ppm. The desulfurization catalyst can include a solid carbon support material having oxidizing groups appended to the surface, wherein the solid carbon support material can selected from activated carbon, activated carbon fiber, carbon black, activated carbon fabric, and activated carbon honeycomb, and the oxidizing groups can be selected from sulfur trioxide and nitrogen dioxide:

In a second aspect, a method of producing an oxidative desulfurization catalyst is provided that includes the steps of providing a solid carbon support material; contacting the solid carbon support material with a gas comprising sulfur dioxide, nitrogen oxide or nitrogen dioxide to append the groups to the surface of the solid carbon support material; and contacting the solid carbon support material and the appended groups with molecular oxygen to produce sulfur trioxide and nitrogen dioxide groups on the surface of the solid carbon support material.

In certain embodiments, the solid carbon support material can selected from activated carbon, activated carbon fiber, carbon black, activated carbon fabric, and activated carbon honeycomb and have a surface area of at least about 500 m²/g.

In another aspect, an oxidative desulfurization catalyst is provided that includes a solid carbon support material having oxidizing groups appended to the surface. In certain embodiments, the solid carbon support material can be selected from activated carbon, activated carbon fiber, carbon black, activated carbon fabric, and activated carbon honeycomb, and have a surface area of at least about 500 m²/g.

In another aspect, a method of producing an oxidative desulfurization catalyst is provided. The method includes providing a solid carbon support material, wherein the solid carbon support material is selected from activated carbon, activated carbon fiber, carbon black, activated carbon fabric, and activated carbon honeycomb; contacting the solid carbon support material with a gas comprising an oxidizing functional group or a precursor to an oxidizing functional group to append an oxidizing functional group or precursor to an oxidizing functional group to the surface of the solid carbon support material; and contacting the solid carbon support material and the appended groups with molecular oxygen to produce oxidizing functional groups.

In another aspect, an apparatus for desulfurizing a hydrocarbon stream is provided. The apparatus includes means for supplying a hydrocarbon feed stream and a first desulfurization vessel. The first desulfurization vessel includes an inlet and an outlet, and the hydrocarbon feed stream is supplied to the inlet of the first desulfurization vessel. The apparatus also includes means for recovering a hydrocarbon product stream exiting from the first desulfurization vessel, wherein the hydrocarbon product stream is recovered through the outlet of the first desulfurization vessel. The hydrocarbon product stream exiting the first desulfurization vessel has a reduced sulfur content relative to the hydrocarbon stream. The first desulfurization vessel is charged with an oxidative desulfurization catalyst that includes a solid carbon support material having an oxidative species appended to the surface thereof, wherein the oxidative species is selected from the group consisting of sulfur trioxide and nitrogen dioxide.

In certain embodiments, at least one of the desulfurization vessels can be charged with a hydrodesulfurization catalyst. In certain embodiments, the apparatus further includes a mixer positioned upstream of the desulfurization vessel. The mixer includes a first mixer inlet and second mixer inlet. The first mixer inlet is configured to receive the hydrocarbon feed stream, and the second mixer inlet is configured to receive a gas that includes molecular oxygen. The mixer is operable to mix the hydrocarbon feed stream and the gas that includes molecular oxygen. The apparatus can also include a separator positioned downstream of the desulfurization vessel, wherein separator includes a separator inlet and a separator outlet. The separator inlet is configured to receive a hydrocarbon product stream and the separator outlet is configured to produce a desulfurized hydrocarbon product stream. The separator is operable to separate the desulfurized hydrocarbon product stream from a stream that includes oxidized sulfur compounds.

BRIEF DESCRIPTION OF THE DRAWINGS

So that the manner in which the features, advantages and objects of the invention, as well as others that will become apparent, may be understood in more detail, more particular description of the invention briefly summarized above may be had by reference to the embodiment thereof which is illustrated in the appended drawings, which form a part of this specification. It is to be noted, however, that each drawing illustrates one embodiment of the invention and is therefore not to be considered limiting of the invention's scope as it may admit to other equally effective embodiments.

DETAILED DESCRIPTION OF THE INVENTION

Figure 1:
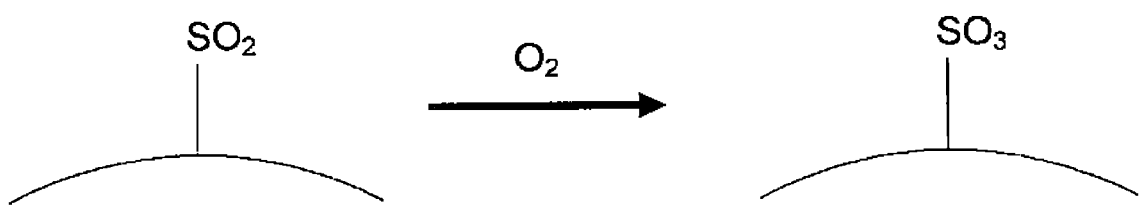
FIG. 1 is a schematic for the production of oxidizing species on the support surface

The present invention incorporates oxidizing species and adsorption materials having high affinity for sulfur compounds.

Oxidative desulfurization is one process by which refractory sulfur compounds can be removed from a hydrocarbonaceous feedstock. Utilizing oxidative desulfurization, it is possible to obtain hydrocarbon streams having a sulfur content of less than about 10 ppm, preferably less than about 5 ppm. In certain embodiments, oxidative desulfurization of a hydrocarbonaceous stream can result in a product stream having a sulfur content of less than about 1 ppm. Sulfur compounds, including thiophenic sulfur compounds and sterically hindered thiophenic sulfur compounds, can be converted to organic sulfoxides and/or sulfones, and can then be removed from the hydrocarbonaceous feedstock.

As used herein, the term "hydrocarbonaceous" is used to describe various suitable feedstocks and is intended to include gaseous, liquid, and solid hydrocarbons, carbonaceous materials, and mixtures thereof. In fact, substantially any combustible carbon-containing organic material, or slurries thereof, may be included within the definition of the term "hydrocarbonaceous". Solid, gaseous, and liquid feeds can be mixed and used simultaneously; and these may include paraffinic, olefinic, acetylenic, naphthenic, asphaltic, and aromatic compounds in any proportion. Also included within the definition of the term "hydrocarbonaceous" are oxygenated hydrocarbonaceous organic materials including carbohydrates, cellulosic materials, plastics, aldehydes, organic acids, alcohols, ketones, oxygenated fuel oil, waste liquids and by-products from chemical processes containing oxygenated hydrocarbonaceous organic materials, and mixtures thereof.

Generally, for the selective oxidative desulfurization of thiophenic sulfur compounds, inorganic and organic peroxide compounds can be preferably used as the oxidizing agents. In certain instances, the oxidizing agents can be used in combination with homogeneous or heterogeneous catalysts. While the use of molecular oxygen for oxidation reaction is generally known in the art, the activity of molecular oxygen is generally too low for practical use with refractory sulfur species.

Nitrogen compounds, such as for example, nitrogen dioxide can be used for oxidizing thiophenic sulfur compounds from hydrocarbonaceous feedstocks. One method known in the art for the oxidative desulfurization of thiophenic compounds employing nitrogen dioxide includes the use of a bubble generator to aid in the dispersion of the oxidizing species.

Major problems typically associated with the oxidative desulfurization of hydrocarbonaceous feedstocks can include, the use of peroxide and a hydrocarbonaceous oil stream, the use of a solvent and a hydrocarbonaceous oil stream, low activity of the catalyst, and general difficulty in separating oxidized thiophenic sulfur compounds from the hydrocarbonaceous feedstock.

Peroxides, which can be present as either an organic or inorganic species, are preferably well mixed with the hydrocarbonaceous feedstock to ensure maximum oxidation of the thiophenic sulfur compounds present. When inorganic peroxides, such as, for example, hydrogen peroxide, are employed, it is advantageous that the peroxide be premixed with a suitable solvent prior to mixing with the hydrocarbonaceous feedstock to ensure maximum contact between the thiophenic sulfur compounds and the peroxide species.

There have been previous reports of the adsorptive removal of thiophenic sulfur compounds from petroleum products by way of adsorption. For example, Sano, et al. have reported the use of activated carbon for the removal of thiophenic sulfur compounds, in particular alkylated dibenzothiophenes, from partially hydrotreated straight run gas oil (SRGO). In particular, OG-20A, an activated carbon fiber reportedly prepared from petroleum pitch and having a surface area of greater than 1900 $m^2/g$, was reportedly useful for removal of refractory sulfur species and nitrogen containing compounds. The adsorption capacity of the adsorbent has been reported at approximately 12 mL oil/g activated carbon fiber to treat SRGO of 300 ppm sulfur for producing a product having sulfur content less than 10 ppm sulfur. However, the adsorption capacity was too low to be applied to practical.

Although the present invention is particularly useful for the production of ultra low sulfur diesel and gasoline, any suitable hydrocarbonaceous feedstock can be used in the present invention. Illustrative hydrocarbon feedstocks include diesel and gasoline and those containing components boiling between about 50° C. and about 400° C.

The selected feedstock can be separated by fractionation or any other convenient method to produce a first hydrocarbon stream containing more sulfur compounds and a second hydrocarbon stream containing less sulfur compounds. The first stream will likely have a high content of refractory sulfur compounds. Certain hydrocarbonaceous compounds due to their physical characteristics are more resistant to desulfurization than other hydrocarbonaceous compounds having different characteristics. Therefore, the hydrocarbonaceous sulfur compounds, which are difficult to desulfurize, are considered to be refractory.

Optionally, the streams can be contacted with a hydrotreating catalyst under typical desulfurization conditions to initially remove a major portion of the sulfur compounds present. Generally, non-refractory sulfur compounds will be removed during the initial desulfurization step with a hydrotreating catalyst, providing a hydrocarbon stream of relatively low sulfur content, but still including the refractory sulfur species.

Typical desulfurization catalysts include any known conventional hydrotreating catalyst and include those which are comprised of at least one Group VIB metal, preferably molybdenum or tungsten, and at least one Group VIIIB metal, preferably selected from iron, cobalt and nickel. Typical hydrotreating catalysts include a support material having a high surface area, such as for example, alumina, silica, or silica-alumina. Typically the Group VIIIB metal is present in an amount ranging from about 1 to about 10 weight percent, preferably from about 1 to 5 weight percent. The Group VIB metal is present in an amount ranging from about 1 to 30 weight percent, preferably from about 3 to 25 weight percent.

Desulfurization Catalyst

In one aspect, a desulfurization catalyst useful in the removal of sulfur compounds from a hydrocarbon feedstock is provided.

A support material can be provided, preferably having a high surface area. Exemplary support materials can include solid carbon support material, including activated carbon, activated carbon fiber, carbon black, activated carbon fabric, activated carbon honeycomb, and the like and combinations thereof. The support materials can generally be any shape. In certain embodiments, the solid carbon support materials can be activated carbon in granule, pellet and/or sphere shapes. In other embodiments, the solid carbon support materials can be a carbon fiber in either fabric or non-fabric form.

In certain embodiments, the support material can be activated carbon or activated carbon fiber. In certain embodiments, the activated carbon fiber can have a diameter of less than about 1 mm. In certain other embodiments, the activated carbon fiber can have a diameter of less than about 50 μm. The support material preferably has a surface area of at least about 500 $m^2/g$, more preferably at least about 1000 $m^2/g$, and even more preferably at least about 1500 $m^2/g$. A high surface area allows more active sites available to desulfurization.

The catalyst support material can be exposed to a precursor to the oxidizing species. In one embodiment, the support material, which in certain embodiments includes activated carbon or activated carbon fiber, can be exposed to sulfur dioxide, which can be readily adsorbed onto the surface of the support material. As shown in FIG. 1, the precursor to the oxidizing group, in this example sulfur dioxide, can then be converted to the oxidizing group, in this case the peroxide species sulfur trioxide, upon exposure to molecular oxygen at room temperature and atmospheric pressure.

In another embodiment, the support material can be exposed to nitrogen oxide or nitrogen dioxide. Nitrogen oxide can be converted into the desired peroxide species, nitrogen dioxide, by exposure to molecular oxygen at room temperature and atmospheric pressure.

In certain embodiments, copper oxide can be appended to the surface of the support material. Copper oxide is believed to assist in the regeneration of spent catalyst. Copper oxide can be present in an amount of between about 0.1 and about 10 weight %. Preferably, at least about 1 weight % of copper oxide is present.

Spent catalyst can be regenerated by repeating the steps taken during the preparation of the catalyst. In certain embodiments, the catalyst can be regenerated by exposing the spent catalyst to a gas stream that includes molecular oxygen. In other embodiments, the catalyst can be regenerated by contacting the spent catalyst with common organic solvents. An exemplary organic solvent is isopropyl alcohol.

Preparation of Desulfurization Catalyst

In another aspect, a method for preparing a desulfurization catalyst useful for the removal of sulfur compounds from a hydrocarbon feedstock is provided.

The catalyst support can be exposed to gas containing sulfur dioxide, nitrogen oxide and/or nitrogen dioxide, which can be adsorbed by the surface of the support material. Suitable carrier gases can include, but are not limited to, air, oxygen, nitrogen, helium, argon or the like. In one embodiment, the carrier gas is flue gas from a fluidized catalytic cracker (FCC), which is useful because it contains sulfur dioxide. Preferably, the gas containing the sulfur dioxide, nitrogen oxide and/or nitrogen dioxide have a moisture content of less than about 100 ppm by volume to prevent the formation of sulfuric acid and/or nitric acid.

Preferably, the carrier gas and sulfur oxide or nitrogen oxide-containing gases pass through the solid carbon support material, thereby allowing attachment to the interior surfaces of the support material. Exemplary support materials include activated carbon and activated carbon fiber, as sulfur dioxide, nitrogen oxide and/or nitrogen dioxide are each readily adsorbed onto the surfaces of these materials. The gas can be contacted with the catalyst support at room temperature or at an elevated temperature. In certain embodiments, the catalyst support can be contacted with a gas which contains sulfur dioxide, nitrogen oxide and/or nitrogen dioxide at a temperature up to about 100° C. In other embodiments, the catalyst support can be contacted with a gas which contains sulfur dioxide, nitrogen oxide and/or nitrogen dioxide at a temperature up to about 50° C. In certain embodiments, the catalyst support can be contacted with a gas which contains sulfur dioxide, nitrogen dioxide or nitrogen oxide at between room temperature and about 50° C. Generally, the temperature at which the catalyst support is contacted with the gas is sufficiently low to prevent the evolution of carbon monoxide and carbon dioxide. Carbon monoxide and carbon dioxide gases are evolved when the catalyst support is saturated with sulfur dioxide, nitrogen oxide or nitrogen dioxide at elevated temperature, for example, at a temperature greater than about 100° C.

The support material can optionally be treated with an inert gas stream prior to being subjected to sulfur dioxide and/or nitrogen oxide. Exemplary inert gases can include helium, nitrogen, argon and the like. In certain embodiments, the adsorbent materials can be heated under inert gas flow, provided the surface area of the support material does not decrease during heating. The support material can be heated to temperatures up to about 1500° C.; preferably between about 500° C. and about 1500° C.

The appended sulfur dioxide and nitrogen oxide groups can be exposed to a molecular oxygen containing gas to generate sulfur trioxide and nitrogen dioxide. In certain embodiments, when nitrogen, helium or argon gases are used, a molecular oxygen containing gas can be flowed to generate sulfur trioxide and/or nitrogen dioxide.

The sulfur trioxide and nitrogen dioxide can generate free oxygen species which can oxidize thiophenic species contained in hydrocarbon species. The generation of the free oxygen species results in the conversion of sulfur trioxide to sulfur dioxide and the conversion of nitrogen dioxide to nitrogen monoxide.

Catalyst that has lost sulfur oxide or nitrogen oxide can be regenerated by repeating the above steps, including heating and exposing to either a sulfur dioxide, nitrogen oxide or nitrogen dioxide stream, and oxidizing the appended groups with molecular oxygen. In another embodiment, the catalyst can be regenerated by washing with organic solvents. When organic solvents are used to regenerate the catalyst, a ratio of organic solvent to catalyst of at least about 5:1 volume/volume can be employed. In certain embodiments, the ratio of organic solvent to catalyst is at least about 10:1 volume/volume.

In certain embodiments, copper oxide can be appended to the surface of the catalyst. It is believed that the copper oxide plays a role during the regeneration of the catalyst. The copper oxide can be present on the surface of the catalyst in an amount of at least 1 weight %, preferably between about 0.1 and about 10 weight %.

Figure 2A:
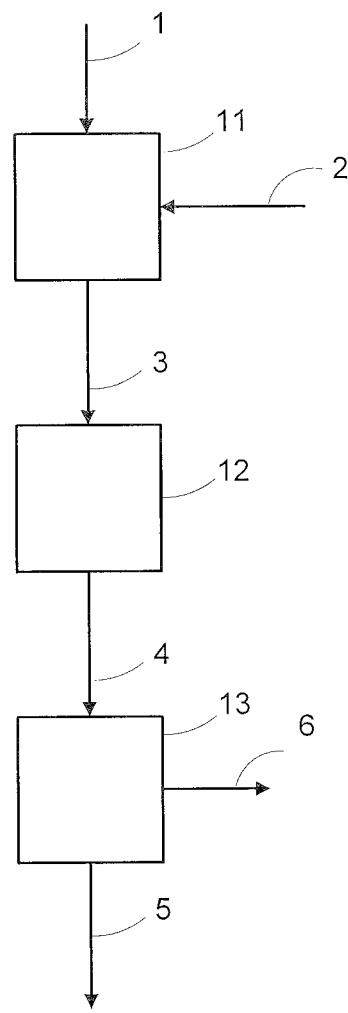
FIG. 2A depicts a schematic of one embodiment of the process for the removal of sulfur from a hydrocarbon stream.
Figure 2B:
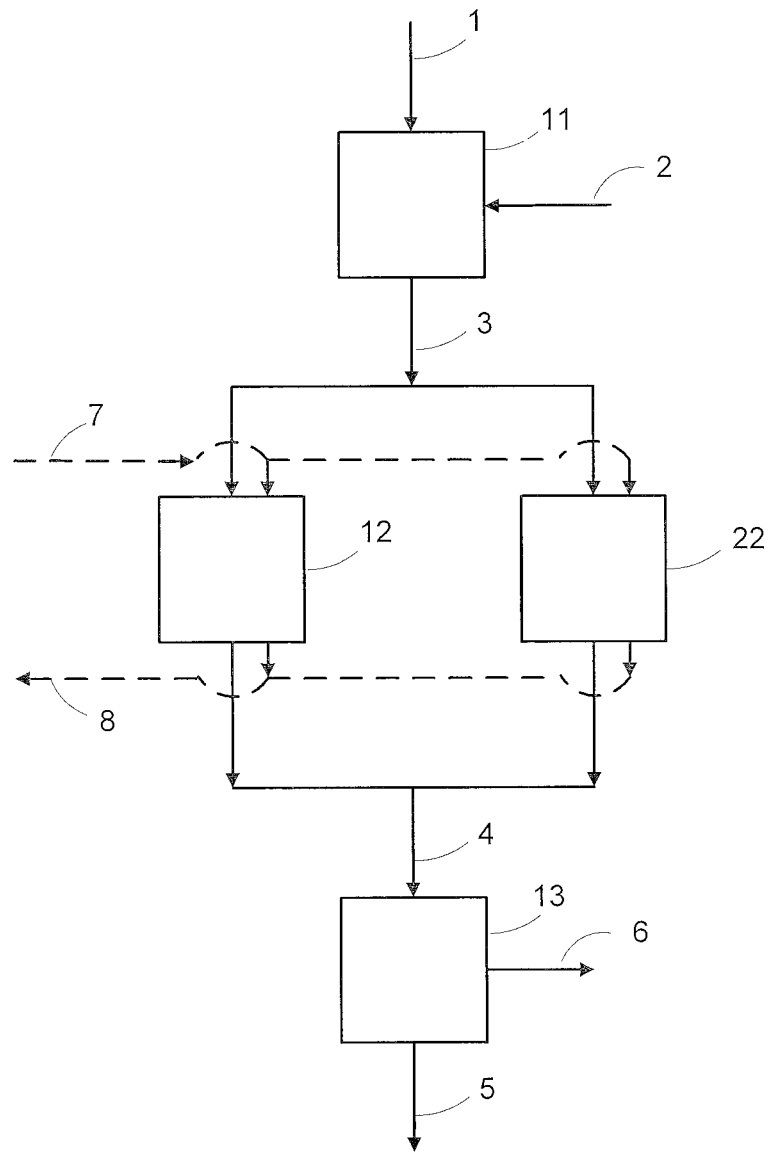
FIG. 2B depicts a schematic of one embodiment of the process for the removal of sulfur from a hydrocarbon stream.

In one embodiment, as shown in FIG. 2A, hydrocarbon stream 1 and a gas which contains molecular oxygen 2 are feed to mixer 11, which includes means for providing substantial mixing of streams 1 and 2. Mixer effluent 3 is supplied to oxidative desulfurization reactor 12, which, can include a catalyst prepared according to the present invention. Effluent 4 from oxidative desulfurization reactor 12, which includes both hydrocarbons and oxidized sulfur compounds, can be supplied to separator 13, which produces desulfurized hydrocarbon product stream 5 and stream 6, which includes oxidized sulfur compounds that have been removed from the hydrocarbon feedstock. As shown in FIG. 2B, optional second oxidative desulfurization reactor 22 can be included in the overall desulfurization process and positioned between mixer effluent 3 and effluent 4. Typically, inlet 3 and outlet stream 4, to and from oxidative desulfurization reactors 12 and 22, can include valves (not shown), allowing the respective oxidative desulfurization reactors to be taken off line for regeneration. For purposes of catalyst regeneration, oxidative desulfurization reactors 12 and 22 can each be separately coupled to a source for sulfur dioxide, nitrogen oxide and/or nitrogen dioxide, and molecular oxygen, which may be supplied to the oxidative desulfurization reactors by feed lines 7 which can include also valve means. Effluent 8 from the regeneration process can be subjected to a flare stack or other suitable exhaust gas treatment. The catalyst in oxidative desulfurization reactors 12 and 22 can be regenerated, as described herein.

Figure 3A:
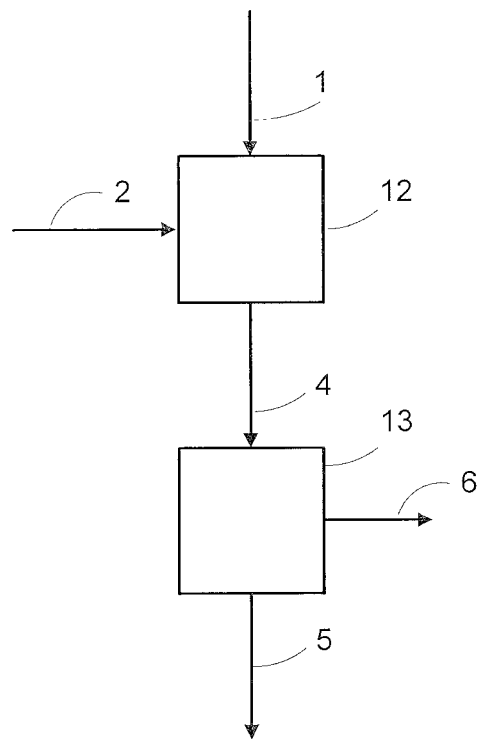
FIG. 3A depicts a schematic of another embodiment of the process for the removal of sulfur from a hydrocarbon stream.
Figure 3B:
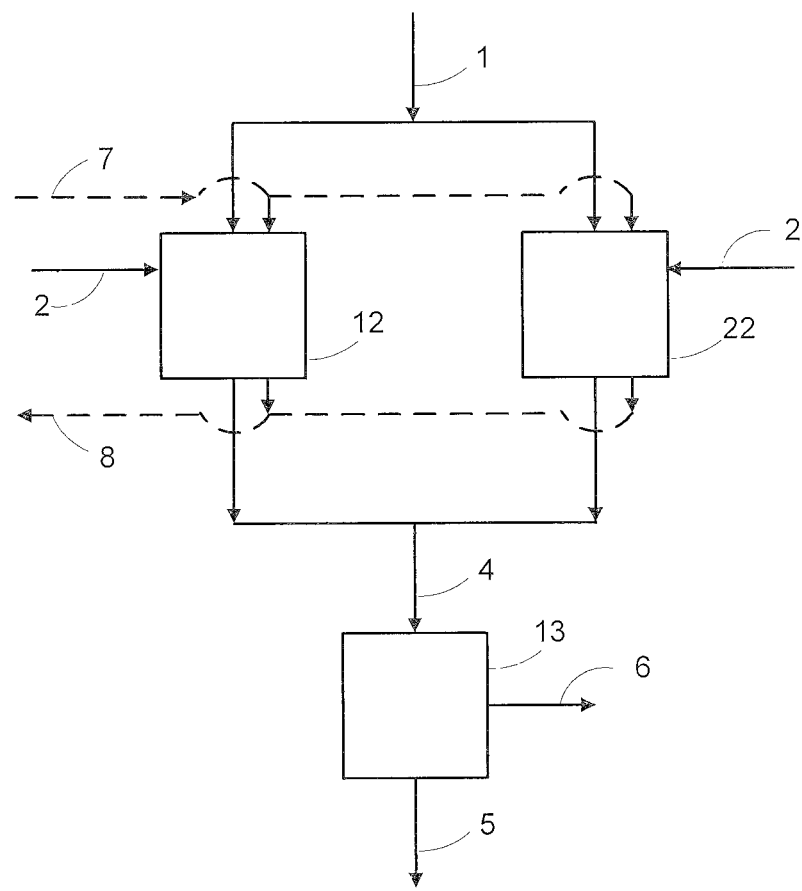
FIG. 3B depicts a schematic of one embodiment of the process for the removal of sulfur from a hydrocarbon stream.
Figure 4:
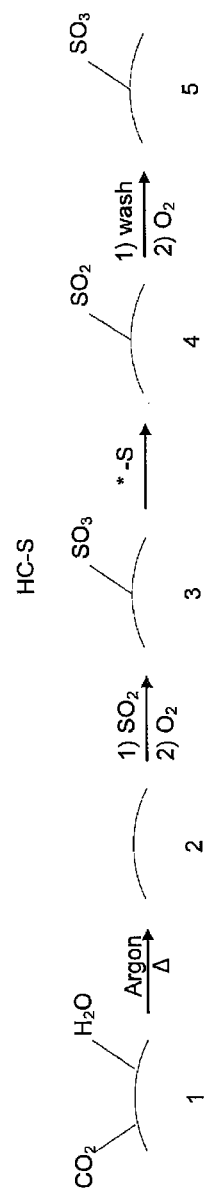
FIG. 4 depicts a schematic of one embodiment of the process for the preparation of the oxidative desulfurization catalyst and the removal of sulfur from a hydrocarbon stream.

In another embodiment, as shown in FIG. 3A and FIG. 3B, hydrocarbon feedstock 1 and molecular oxygen 2 can be supplied directly to oxidative desulfurization reactor 12, without first employing mixing means 11.

Figure 5B:
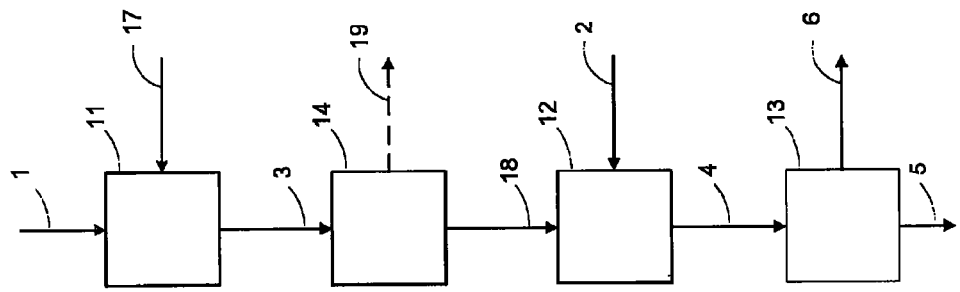
FIG. 5B depicts a schematic of one embodiment of the process for the removal of sulfur from a hydrocarbon stream.
Figure 5A:
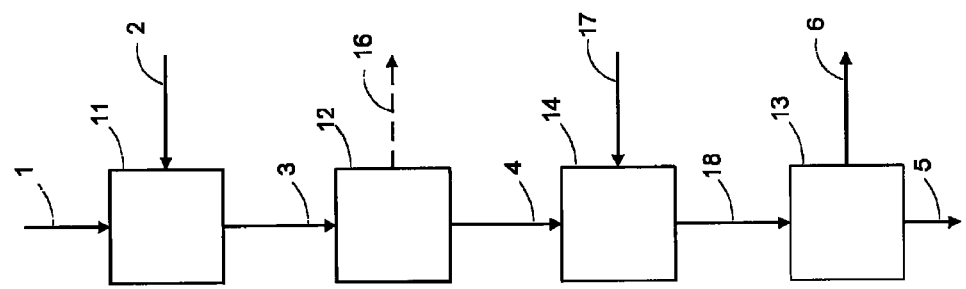
FIG. 5A depicts a schematic of one embodiment of the process for the removal of sulfur from a hydrocarbon stream.

In another embodiment, as shown in FIG. 5A, hydrocarbon feedstock 1 and molecular oxygen 2 are fed to mixer 11, which includes means for providing substantial mixing of streams 1 and 2. Mixer effluent 3 is supplied to oxidative desulfurization reactor 12, which can include a catalyst prepared according to the present invention. A hydrocarbon stream 4 having a sulfur content less than hydrocarbon feedstock 1 is collected from oxidative desulfurization reactor 12 via line 4 and supplied to hydrodesulfurization reactor 14. In certain embodiments, oxidative desulfurization reactor 12 can include means to separate oxygen stream 16 from hydrocarbon stream 4. In other embodiments, a separator (not shown) can be employed to remove oxygen and oxidized sulfur products from hydrocarbon stream 4 before it is fed to hydrodesulfurization reactor 14. Hydrodesulfurization reactor 14 can be supplied with hydrogen gas 17 and can include a traditional hydrodesulfurization catalyst. In certain embodiments, reactor 14 can include means for substantially mixing hydrocarbon stream 4 and hydrogen gas 17. Hydrodesulfurization reactor 14 produces a desulfurized hydrocarbon product stream 18, which has a sulfur content less than that of hydrocarbon stream 4. Hydrocarbon stream 18 is supplied to separator 13, which produces desulfurized hydrocarbon product stream 5 and stream 6, which includes oxidized sulfur compounds that have been removed from the hydrocarbon feedstock.

In another embodiment, as shown in FIG. 5B, hydrocarbon feedstock 1 and hydrogen gas 17 are fed to mixer 11, which includes means for providing substantial mixing of streams 1 and 17. Mixer effluent 3 is supplied to hydrodesulfurization reactor 14, which can include a traditional hydrodesulfurization catalyst. A hydrocarbon stream 18 having a sulfur content less than hydrocarbon feedstock 1 is collected from reactor 14 via line 18 and supplied to oxidative desulfurization reactor 12, which includes a catalyst prepared according to the present invention. In certain embodiments, hydrodesulfurization reactor 14 can include means to separate hydrogen gas stream 19 from hydrocarbon stream 4. In other embodiments, a separator (not shown) can be employed to remove hydrogen gas from hydrocarbon stream 18 before it is supplied to oxidative desulfurization reactor 12. Oxidative desulfurization reactor 12 can be supplied with molecular oxygen 2. In certain embodiments, oxidative desulfurization reactor 12 can include means for substantially mixing hydrocarbon stream 4 and molecular oxygen 2. Oxidative desulfurization reactor 12 produces a desulfurized hydrocarbon product stream 4, which has a sulfur content less than that of hydrocarbon stream 18. Hydrocarbon stream 4 is supplied to separator 13, which produces desulfurized hydrocarbon product stream 5 and stream 6, which includes oxidized sulfur compounds that have been removed from the hydrocarbon feedstock.

As shown in FIG. 2B, optional second oxidative desulfurization reactor 22 can be included in the overall desulfurization process and positioned between mixer effluent 3 and effluent 4.

Typically, inlet 3 and outlet stream 4, to and from oxidative desulfurization reactors 12 and 22, can include valves (not shown), allowing the respective oxidative desulfurization reactors to be taken off line for regeneration.

For purposes of catalyst regeneration, oxidative desulfurization reactors 12 and 22 can each be separately coupled to a source for sulfur dioxide, nitrogen oxide and/or nitrogen dioxide, and molecular oxygen, which may be supplied to the oxidative desulfurization reactors by feed lines 7 which can include also valve means.

Effluent 8 from the regeneration process can be subjected to a flare stack or other suitable exhaust gas treatment.

The catalyst in oxidative desulfurization reactors 12 and 22 can be regenerated, as described herein.

Desulfurization of Hydrocarbons

In one aspect, a method of producing a reduced sulfur hydrocarbon feedstock is provided.

The method includes the steps of contacting a hydrocarbon feedstock with a desulfurization catalyst wherein the desulfurization catalyst includes a solid carbon support material having one or more of sulfur dioxide, sulfur trioxide, nitrogen oxide and nitrogen dioxide adsorbed on the surface.

The hydrocarbon feedstock can be a derivative from crude petroleum oil, oil sands, oil shale, or oil derived form coal or wood. Generally, any hydrocarbon oil that includes sulfur or sulfur impurities, can be used as a suitable hydrocarbon feedstock.

A gas which includes molecular oxygen can be supplied to the reactor either directly with, or alternately with, the hydrocarbon feed. In certain embodiments, molecular oxygen and air are supplied to the reactor. In certain other embodiments, molecular oxygen and inert gas are supplied to the reactor. In another embodiment, molecular oxygen and air can be mixed with the hydrocarbon feedstock prior to contacting the feedstock with the catalyst. In certain embodiments, the mixing of the hydrocarbon stream and the molecular oxygen containing gas can be facilitated with a suitable device, such as for example, an ultrasonic homogenizer, high speed turbine, or the like, prior to addition of the hydrocarbon feed-oxygen containing gas.

The reactor effluent can be separated into a first stream that includes a low sulfur hydrocarbon feedstock, and a second stream that includes oxidized thiophenic species. Separation of the species can be achieved by known means, such as for example, distillation, solvent extraction or adsorption. Distillation of the effluent from the oxidation process is generally susceptible to separation by distillation because the oxidized thiophenic sulfur compounds typically have boiling points greater than that of the hydrocarbons present in the feedstock. In certain embodiments, the separation is achieved by flowing the effluent stream into an adsorption bed which includes an adsorbent material that selectively remove thiophenic sulfur compounds, such as for example, silica, alumina, silica-alumina, clay, zeolite, or the like. The adsorbent material can have a high affinity toward polar compounds, thus providing an effective way to separate the oxidized thiophenic compounds from the hydrocarbons.

Desulfurization can take place in a reactor, such as for example, a fixed bed, packed bed, slurry bed or fluidized bed reactor, which can be charged with an oxidative desulfurization catalyst which is prepared as described herein.

The overall process can include multiple reactors arranged in parallel. This arrangement allows for continuous operation of the desulfurization process while also allowing for the simultaneous regeneration of spent catalyst.

The process and catalyst described herein are advantageously solid heterogeneous catalysts. Because the catalyst is a heterogeneous catalyst, there is no need to determine suitable organic solvents for solubility of oxidizing agent, catalyst and hydrocarbonaceous feedstock. Additionally, because the catalyst is a solid material, and dissolution of catalyst in reaction matrix is not an important aspect of the desulfurization, there is never any need to separately remove solvent or an oxidizing agent from the effluent.

As shown in FIG. 5, the process for the preparation of the desulfurization catalyst, removal of sulfur from a hydrocarbon stream, and regeneration of catalyst is shown. In step 1, activated carbon fiber is provided as a catalyst support material, having water and/or carbonyl molecules bound or associated to the surface, is heated under argon to remove surface bound molecules. In step 2, the desulfurization catalyst is prepared by exposing the activated carbon fiber first to a gas that contains sulfur dioxide, followed by exposure to molecular oxygen to produce surface bound sulfur trioxide. Alternatively, the gas can contain nitrogen oxide or nitrogen dioxide, which can be oxidized to nitrogen dioxide. In step 3, the desulfurization catalyst is contacted with a sulfur containing hydrocarbon (shown as HC—S) to oxidatively remove the sulfur. In step 4, the spent desulfurization catalyst is regenerated by first washing with organic solvent, followed by exposure to molecular oxygen to regenerate the sulfur trioxide species. As shown in step 5, the desulfurization catalyst is regenerated and the surface bound sulfur trioxide is available for oxidative desulfurization of additional sulfur containing hydrocarbons.

EXAMPLE

An activated carbon fiber (hereinafter ACF or "the fiber"), prepared from polyacrylonitrile (PAN) and having a surface area of approximately 1040 $m^2/g$, was pretreated by heating the fiber to approximately 1000° C. for approximately 12 hours under a flowing argon stream. The fiber was cooled to room temperature under an argon flow.

Approximately 15.2 g of the treated ACF were packed into a 100 mL tubular reactor. The ACF was again pretreated by heating to approximately 200° C. for approximately 2 hours under argon flow, and was cooled to room temperature under an argon flow. The fiber was contacted with gas which includes approximately 1 vol. % of $SO_2$ and approximately 10 vol. % $O_2$, which was diluted with helium to achieve a concentration of approximately 0.98 vol. % $SO_2$. Upon completion of the loading, the ACF was kept under an argon blanket until reaction.

A hydrotreated straight run gas oil (SRGO) having a sulfur content of approximately 340 ppm sulfur was introduced into the reactor at a rate of approximately 50 mL/hour with an HPLC pump over a period of approximately 3 hours. Liquid yield from the reactor is approximately 99.5 vol. % and total sulfur content of the effluent is approximately 295 ppm sulfur.

The reactor effluent was charged to an adsorption bed of approximately 100 mL, and packed with chromatographic silica powder at a rate of approximately 30 mL/hour. Effluent was determined to have a sulfur content of approximately 12 ppm.

As used herein, the terms about and approximately should be interpreted to include any values which are within 5% of the recited value. In addition, when the terms about or approximately are used in conjunction with a range of values, the terms should be interpreted to apply to both the low end and high end values of that range.

While the invention has been shown or described in only some of its embodiments, it should be apparent to those skilled in the art that it is not so limited, but is susceptible to various changes without departing from the scope of the invention.

I claim:

1. A method for removing sulfur from a hydrocarbonaceous feedstock that includes refractory sulfur compounds, comprising the steps of:
    contacting a hydrocarbonaceous feedstock that includes refractory sulfur compounds with an oxidative desulfurization catalyst to selectively oxidize at least a portion of the refractory sulfur compounds present to produce oxidized sulfur compounds and a low sulfur hydrocarbonaceous feedstock, said oxidative desulfurization catalyst comprising a solid carbon support material having oxidizing groups appended to the surface, the oxidizing groups being selected from the group consisting of sulfur trioxide, nitrogen dioxide, and combinations thereof, wherein the sulfur trioxide and nitrogen oxide groups are appended to the surface of the solid carbon support material by the steps of first contacting the support material with a gas that includes sulfur dioxide, nitrogen oxide, nitrogen dioxide, or a combination thereof at a temperature of between about 0° C. and 100° C., and then contacting the support material and the sulfur dioxide, nitrogen oxide, nitrogen dioxide, or combination thereof with molecular oxygen to produce the sulfur trioxide or nitrogen dioxide, and wherein the gas has a sufficiently low water content to prevent the formation of acid;
    separating the oxidized sulfur compounds from low sulfur hydrocarbonaceous feedstock; and
    recovering the low sulfur hydrocarbonaceous feedstock.

2. The method of claim 1 wherein the oxidized sulfur compounds are separated from the hydrocarbonaceous feedstock by distillation, solvent extraction or with an adsorbent.

3. The method of claim 1 wherein the solid carbon support material is selected from activated carbon, activated carbon fiber, carbon black, activated carbon fabric, and activated carbon honeycomb.

4. The method of claim 1 wherein the solid carbon support material has a surface area of at least about 500 $m^2/g$.

5. The method of claim 1 wherein the oxidizing groups comprise both sulfur trioxide and nitrogen dioxide.

6. The method of claim 1 wherein the hydrocarbonaceous feedstock and desulfurization catalyst are contacted at a temperature between about 0° C. and 70° C.

7. The method of claim 1 wherein the oxidative desulfurization catalyst is prepared by contacting the solid carbon support material with a gas that comprises sulfur dioxide, nitrogen oxide or nitrogen dioxide such that oxidizing groups are appended to the surface of the support material and contacting the solid carbon support material with molecular oxygen to produce sulfur trioxide and nitrogen dioxide groups on the surface of the surface of the solid carbon support material.

8. The method of claim 7 wherein the solid carbon support material is heated to a temperature between about 500° C. and 1500° C. under in an inert atmosphere prior to contacting the solid carbon support material with the gas that comprises sulfur dioxide, nitrogen oxide or nitrogen dioxide, such that the heating step removes impurities from the surface while maintaining the surface area volume of the solid carbon support material.

9. The method of claim 7 wherein the oxidative desulfurization catalyst further comprises copper oxide bound to the surface of the solid carbon support material.

10. The method of claim 1 wherein the step of contacting the solid carbon support material with a gas that comprises sulfur dioxide, nitrogen oxide or nitrogen dioxide is conducted for a period of time operable to allow for absorption of the gas molecules onto the solid carbon support material.

11. The method of claim 1, wherein the refractory sulfur compounds are oxidized to organic sulfones and organic sulfoxides.

12. The method of claim 1, wherein the refractory sulfur compounds comprise thiophenes.

13. A method for removing refractory sulfur compounds from a hydrocarbonaceous feedstock, comprising the steps of:
    contacting a hydrocarbonaceous feedstock that includes refractory sulfur compounds with a oxidative desulfurization catalyst to selectively oxidize at least a portion of the refractory sulfur compounds present to produce oxidized sulfur compounds and a low sulfur hydrocarbonaceous feedstock, said oxidative desulfurization catalyst comprising a solid carbon support material having sulfur trioxide oxidizing groups appended to the surface;
    separating the oxidized refractory sulfur compounds from low sulfur hydrocarbonaceous feedstock; and
    recovering the low sulfur hydrocarbonaceous feedstock;
    wherein the sulfur trioxide oxidizing groups are appended to the surface of the solid carbon support by contacting the solid carbon support material with a gas that comprises sulfur dioxide to append sulfur dioxide to the surface of the solid carbon support material and then contacting the solid carbon support material with molecular oxygen to produce sulfur trioxide groups on the surface of the surface of the solid carbon support material, and wherein the gas has a sufficiently low water content to prevent the formation of acid.

14. The method of claim 13 wherein the oxidative desulfurization catalyst further comprises copper oxide appended to the surface of the solid carbon support material.

15. The method of claim 13 further comprising the step of heating the solid carbon support material to a temperature between about 500° C. and 1500° C. under in an inert atmosphere prior to contacting the solid carbon support material with the gas that comprises sulfur dioxide, nitrogen oxide or nitrogen dioxide, such that the heating step removes impurities from the surface while maintaining the surface area volume of the solid carbon support material.

16. A method for removing refractory sulfur compounds from a hydrocarbonaceous feedstock, comprising the steps of:
contacting a hydrocarbonaceous feedstock that includes refractory sulfur compounds with a oxidative desulfurization catalyst to selectively oxidize at least a portion of the refractory sulfur compounds present to produce oxidized sulfur compounds and a low sulfur hydrocarbonaceous feedstock, said oxidative desulfurization catalyst comprising a solid carbon support material having nitrogen dioxide oxidizing groups appended to the surface;
separating the oxidized sulfur compounds from low sulfur hydrocarbonaceous feedstock; and
recovering the low sulfur hydrocarbonaceous feedstock;
wherein the nitrogen dioxide oxidizing groups are appended to the surface of the solid carbon support by contacting the solid carbon support material with a gas that comprises nitrogen oxide or nitrogen dioxide to append nitrogen oxide or nitrogen dioxide to the surface of the solid carbon support material and then contacting the solid carbon support material with molecular oxygen to produce nitrogen dioxide groups on the surface of the surface of the solid carbon support material, and wherein the gas has a sufficiently low water content to prevent the formation of acid.

17. The method of claim 16 wherein the oxidative desulfurization catalyst further comprises copper oxide to the surface of the solid carbon support material.

18. The method of claim 16 further comprising the step of heating the solid carbon support material to a temperature between about 500° C. and 1500° C. under in an inert atmosphere prior to contacting the solid carbon support material with the gas that comprises sulfur dioxide, nitrogen oxide or nitrogen dioxide, such that the heating step removes impurities from the surface while maintaining the surface area volume of the solid carbon support material.

\* \* \* \* \*